M. O'CONNOR.
VEHICLE WHEEL.
APPLICATION FILED MAR. 1, 1916.
1,226,362.
Patented May 15, 1917.
2 SHEETS—SHEET 1.
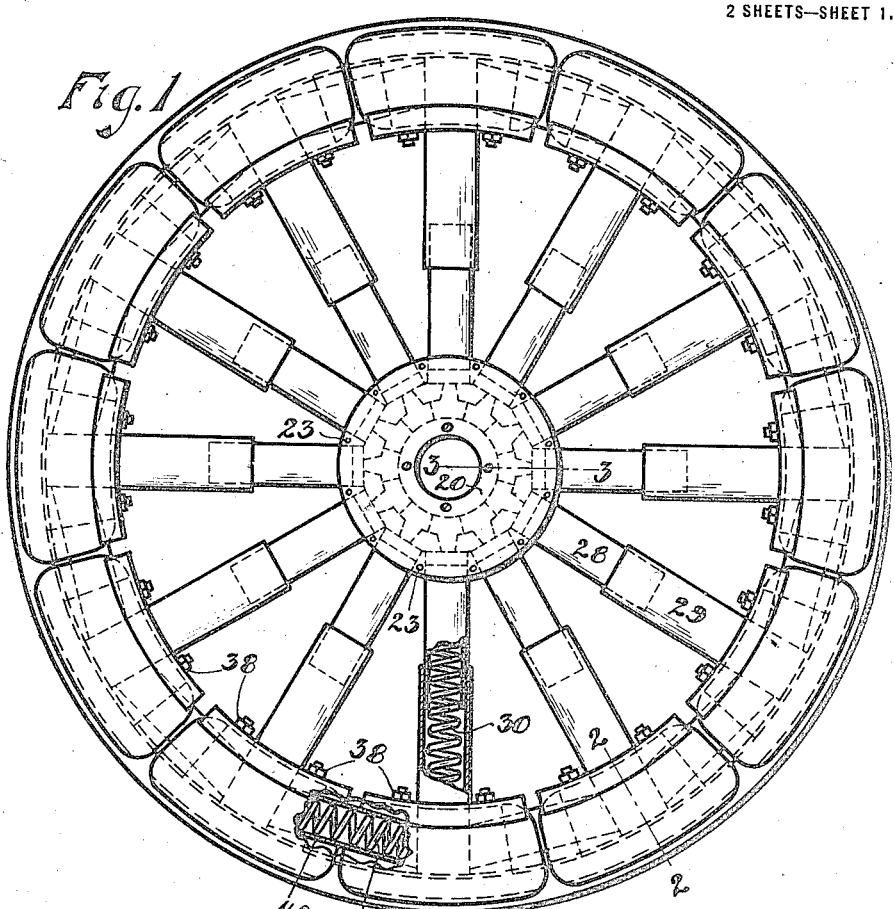
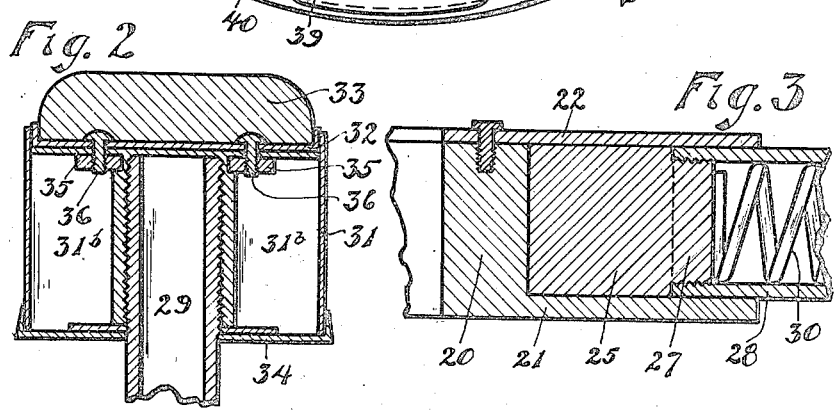
WITNESSES:
Leo J. Griffin
INVENTOR,
MAURICE O'CONNOR,
BY Frank N. Allen
Frederick K. Daggett.
ATTORNEYS.

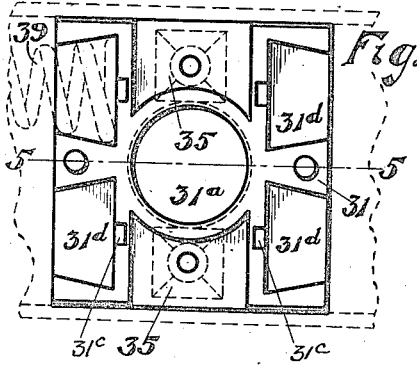
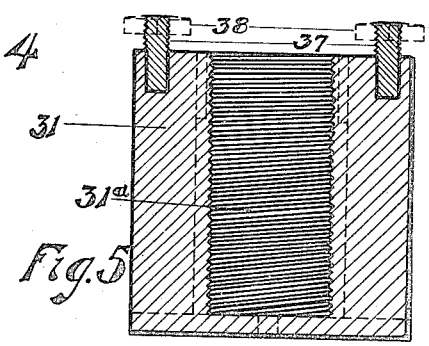
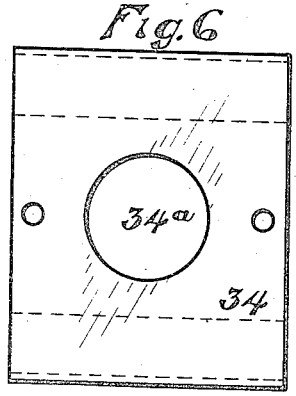
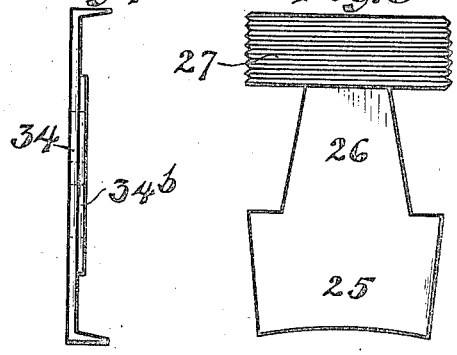
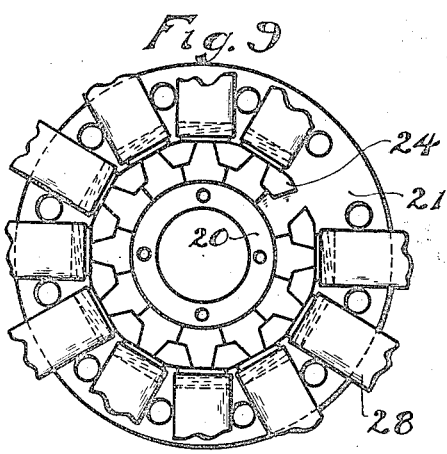
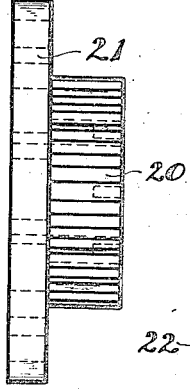
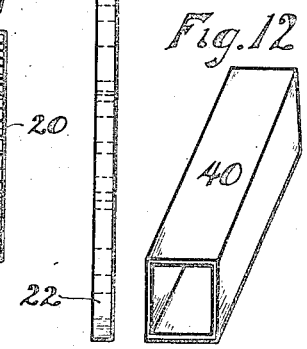

UNITED STATES PATENT OFFICE.

MAURICE O'CONNOR, OF FORT ADAMS, RHODE ISLAND.

VEHICLE-WHEEL.

1,226,362.　　　Specification of Letters Patent.　　Patented May 15, 1917.

Application filed March 1, 1916. Serial No. 81,518.

*To all whom it may concern:*

Be it known that I, MAURICE O'CONNOR, a citizen of the United States, residing at Fort Adams, in the county of Newport and State of Rhode Island, have invented a certain new and useful Improvement in Vehicle-Wheels, of which the following is a specification, reference being had to the accompanying drawings.
This invention relates particularly to wheels of the type most commonly used with automobiles, motor trucks, and the like heavy vehicles, and the immediate object of said invention is to provide a wheel of specially strong, and reasonably cheap, construction in which there is provided a spring - relieved sectional tire, as well as novel means for assembling and clamping together the spokes and hub of the wheel.
The said invention is clearly illustrated in the annexed drawings, Figure 1 being a side elevation partly in section of a wheel embodying the present improvements.

Fig. 2 is a relatively enlarged, transverse, sectional view of the wheel rim and tire, showing also the rim-engaging portion of the spoke, taken on the line 2—2 of Fig. 1.

Fig. 3 is a relatively enlarged, sectional view of a portion of the hub and of one of the spoke supports seated in said hub; the said view being taken on the line 3—3 of Fig. 1. Fig. 4 is an inner face view of the rim section 31, and Fig. 5 is a transverse sectional view of the same taken on the line 5—5.

Figs. 6 and 7 are, respectively, inner face, and edge, views of the protective plate 34.

Fig. 8 is an enlarged side elevation of the hub-engaging portion of one of the spoke fastenings, and Fig. 9 is a view of the hub illustrating particularly the manner of interlocking the said spoke-fastenings with the hub of the wheel. Fig. 10 is an edge view of the principal hub member and Fig. 11 is an edge view of a clamp-plate by means of which the spoke fastenings are prevented from leaving the said hub member.

Fig. 12 is a perspective view of one of the flexible housings used for protecting the rim springs.

Briefly described, the said invention includes novel means for mounting the inner end portions of the spoke supports in the wheel hub, and in combination therewith of means for connecting the tire and its supporting rim with the spokes also in combination therewith a sectional protective guard for the tire, and means for cushioning the otherwise rigid effect of the rim and the tire supports. To that end the present invention includes with the special spoke fastening telescoping spoke members having inclosed therein stiff helical springs to provide a radial cushioning effect, and the wheel rim includes a plurality of sections that are cushioned and spaced apart by springs.

Referring to the annexed drawings, the numeral 20 indicates the wheel hub, the same being formed with a fixed flange 21 and with a removable flange 22 which latter is adapted to be clamped to the said fixed flange by bolts 23, one of said bolts being, by preference, located between each pair of spokes, in order to give stability to the assembled structure.

The fixed flange 21 has formed on its inner face a series of projections 24 that are spaced apart from each other and from the hub proper 20, as is, perhaps, best seen in Fig. 9 of the drawings, the spaces thus provided between the said projections being adapted to receive the correspondingly shaped inner end portions 25 of hub-supporting members 26 each of the said members being formed with external screw-threads 27 upon which is screwed a tube 28 upon which is slidably telescoped a relatively large tube 29; to the outer end of which larger tube is secured a section of the improved rim which will be more specifically described later. Within the described telescoping spoke is a stiff helical spring 30 which acts with a constant tendency to force the connected rim section outward.

One of the said rim sections is illustrated in Figs. 2, 4, 5 and 6 of the drawings, and it consists of three principal members, to wit, the rim section proper 31, a flanged plate 32 which is bolted to the outer face of the section 31 and is adapted to receive and support an endless, solid rubber, tire 33, as well as a plate 34 which is secured to the inner face of the section 31.

The said rim section 31 is formed with a central opening 31ª which is threaded interiorly to receive the exteriorly threaded outer end portion of the tubular spoke member 29 (see Fig. 2); the plate 34 being formed with a central opening 34ª to permit the passage therethrough of the said spoke member, and the plate 34 is faced with a packing 34ᵇ of rubber which serves as a cushion between the said plate and section 31, to deaden the sound, to some extent, when the wheel is in service.

The rim section 31 is cut away, or recessed, as at 31^b to receive the nuts 35 that are screwed upon the inner ends of bolts 36 which bolts serve to clamp the tire supporting plate 32 to the rim section 31.

The bolts 36 are intentionally located so that the nuts 35 (when screwed home on the bolts) will project into the under-cut recesses made in the walls between the central opening 31^a and the recesses 31^b, and so that, after said nuts have been thus located and screwed home, and the spokes 29 have been screwed home in the rim section, the squared nuts will be locked against rotation (see Figs. 2 and 4). The dust plate 34 is secured in place upon the inner face of the rim section 31 by means of bolts 37 and nuts 38.

The opposite ends of the sections 31 are recessed, as at 31^d to receive stiff helical springs 39 which abut the next confronting rim section, as will be understood by reference to the broken-away rim of Fig. 1; these springs 39 operating with a constant tendency to space apart the several rim sections and to provide a complete rim that is more or less flexible and thus relieves or rather prevents rigidity that would result from the use of a one-piece metal rim.

In order to protect the rim springs 39 from dust, etc., I have slipped onto each spring a protective case or housing 40 which may be rectangular in transverse section or may be simply a section of round tubing, but I prefer to use the rectangular form, as the protective case is then held against rotation by the adjacent inner side walls of the rim section. The rim-sections 31 are provided, especially as shown in Fig. 4, with notches or recesses 31^c to provide for the application thereto of a suitable implement for the removal of the springs from the rim recesses 31^d when this may be desired.

The described embodiment in a single wheel, of the several elementary features of novelty, provide a wheel of great strength, with desirable resiliency, and which may be produced at a reasonable cost.

I do not, in this present application, claim broadly the features of supposed novelty regarding the hub of the described wheel, as I have this day filed a separate application with claims covering that feature.

What I claim as new and wish to secure by Letters Patent is:—

In a wheel of the class referred to, in combination with spring-relieved spokes, rim sections secured to the said spokes, springs located between and abutting said rim sections, a flanged tire support on the rim sections, bolts for clamping together the said tire support and rim section, and nuts screwed upon the said bolts; said nuts being located in the rim section and locked against accidental rotation when screwed home in the rim section.

MAURICE O'CONNOR.